United States Patent
Liu et al.

(10) Patent No.: US 7,085,283 B1
(45) Date of Patent: Aug. 1, 2006

(54) AUTOMATIC DATA CPU LOAD REDUCTION IN A HOST-SIGNAL PROCESSING (HSP) BASED ADSL MODEM

(75) Inventors: Ming-King "Max" Liu, Cupertino, CA (US); Steve Chen, San Jose, CA (US); Michael Tsao, Sunnyvale, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

(21) Appl. No.: 09/526,646

(22) Filed: Mar. 15, 2000

(51) Int. Cl.
*H04L 12/43* (2006.01)

(52) U.S. Cl. .................................... 370/459; 375/219
(58) Field of Classification Search ................ 370/287, 370/301, 305, 248, 459, 433, 526, 528, 505, 370/514; 375/219, 222, 224, 364
See application file for complete search history.

(56) References Cited

U.S. PATENT DOCUMENTS

| | | | | |
|---|---|---|---|---|
| 6,052,411 A * | 4/2000 | Mueller et al. | ............. | 370/459 |
| 6,108,350 A * | 8/2000 | Araujo et al. | ............... | 370/467 |
| 6,201,830 B1 * | 3/2001 | Chellali et al. | ............. | 375/222 |
| 6,222,851 B1 * | 4/2001 | Petry | ......................... | 370/447 |
| 6,445,730 B1 * | 9/2002 | Greszczuk et al. | ......... | 375/220 |
| 6,456,650 B1 * | 9/2002 | Cheng et al. | ................ | 370/480 |
| 6,496,566 B1 * | 12/2002 | Posthuma | .................... | 370/248 |
| 6,523,126 B1 * | 2/2003 | Brabenac | ..................... | 713/323 |
| 6,560,197 B1 * | 5/2003 | LeVieux et al. | ............ | 370/231 |
| 6,711,207 B1 * | 3/2004 | Amrany et al. | ............. | 375/222 |
| 6,799,030 B1 * | 9/2004 | Barber et al. | ............... | 375/222 |

\* cited by examiner

*Primary Examiner*—Andrew C. Lee
(74) *Attorney, Agent, or Firm*—Schwegman, Lundberg, Woessner & Kluth, P.A.

(57) ABSTRACT

An ADSL transceiver has a sleep state, in which the received signal is not fully processed, thus reducing a load on a host processor hosting the ADSL transceiver. By arranging for the transceiver to be in a normal state when data is being received or expected to be received, the chance of missing data when not fully processing the received signal is reduced. The transceiver can be prompted to exist the sleep state when data is being transmitted and/or periodically. If no data is detected after a period of time in the normal state, the transceiver returns to the normal state. To avoid introducing errors are the receive section of the transceiver returns to full operation, selected outputs of the transceiver are blocked or ignored by higher layers. To quickly recover from a sleep mode, the receive section might perform minimal maintenance operations, such as maintaining timing and logical boundaries, such as frame counters, interleave boundaries and cell boundaries.

47 Claims, 3 Drawing Sheets

AUTOMATIC DATA CPU LOAD REDUCTION IN A HOST-SIGNAL PROCESSING (HSP) BASED ADSL MODEM

CROSS-REFERENCES TO RELATED APPLICATIONS

The present application is related to U.S. Pat. No. 6,092,122 (U.S. patent application Ser. No. 08/884,979 entitled "Rate Adaptable Modem with Forward Compatible and Expandable Functionality and Method of Operation" filed on Jun. 30, 1997 and U.S. Pat. No. 6,073,179 (U.S. patent application Ser. No. 08/884,959 entitled "User Controllable Applications Program For Rate Adaptable Modem With Forward Compatible and Expandable Functionality" filed on Jun. 30, 1997. Each of those references is hereby incorporated by reference herein for all purposes.

FIELD OF THE INVENTION

The present invention relates to ADSL ("Asymmetric Digital Subscriber Loop") modems in general. More specifically, the present invention relates to ADSL modems that are implemented at least in part using host signal processing (HSP).

BACKGROUND OF THE INVENTION

ADSL technology is a popular choice for high-speed data transmission over existing telephone infrastructures. There are several reasons for this. One is that it operates over existing copper wires that are already present to many households and businesses. While some data communication infrastructures, such as fiber optic cable, may provide greater bandwidth, they require special lines to be run between the subscriber's location and a telephone company central office ("CO"). Some analog modems operating at 56 thousand bits per second (Kbps) do operate over conventional telephone infrastructure (i.e., copper wire from the home/business to the telephone company central office), but 56 Kbps is often unacceptably slow for users that require much higher bit rates for downloading video, graphics and other large datasets.

ADSL has the advantage that the data rates for ADSL can be 1.544 million bits per second (Mbps) or higher, using conventional copper wire. Another advantage of ADSL is that a telephone line is still available for use as a voice connection or for an analog modem connection when ADSL traffic is passing through the line. This is made possible by splitters at both ends of the line (at the subscriber end and at the CO) that separate the ADSL signals and conventional telephone signals at either end. Of course, unlike conventional analog modems, ADSL requires an ADSL modem at the CO end as well as at the subscriber end.

ADSL is a variation of DSL (Digital Subscriber Loop), the variation being that more of the available bandwidth is allocated to the down link (from the CO to the subscriber) than to the up link (form the subscriber to the CO) in recognition of the fact that the typical subscriber will download much more data than upload data. For example, in one configuration, an ADSL modem might provide a downstream link (CO to subscriber) of 6 Mbps and an uplink stream (subscriber to CO) of 640 Kbps.

With a conventional analog modem, the line is only in use when the analog modem dials in to the CO. Typically, the analog modem dials a number associated with a point-of-presence (POP) of the subscriber's service provider who, by a service agreement, agrees to answer the call, connect to the subscriber's modem and carry the subscriber's data traffic. A common arrangement today is the Internet service provider (ISP) with whom the subscriber subscribes, where the ISP carries the subscriber's data and connects the subscriber to the global internetwork of networks known as the "Internet". Since the data traffic is carried through the telephone company infrastructure in the same manner as a telephone call, the telephone company does not need any special hardware to carry the data traffic, nor does the typical telephone company distinguish data traffic from voice traffic on the line. To the telephone company, the connection looks the same: the telephone customer goes "off-hook" (i.e., connects to their telephone line), dials a number, carries on a conversation with the answering party and, eventually, disconnects from the line.

By contrast, an ADSL connection modem is always "on" in that the line between two ADSL modems is in constant use. Since ADSL operations on a copper line do not interfere with its use as a voice line, the constant operation does not interfere with conventional use of the copper line. Another difference between ADSL and many other technologies for transmitting data over a telephone line is that ADSL requires ADSL hardware at the CO. In a typical arrangement, a subscriber's ADSL modem communicates with an ADSL modem at the CO and the CO ADSL modem connects to a data network (most commonly the Internet), thereby allowing the subscriber to connect to the data network over an existing telephone line. Since the CO will have one ADSL modem (or one segment of a multi-line ADSL card) for each subscriber, the telephone company must install considerable numbers of ADSL modems or cards to service those subscribers. Unlike the circuits the telephone company installs at the CO to carry telephone traffic from the CO to the telephone grid, where bandwidth is only allocated to telephone calls that are in progress, the ADSL modems at the CO are also "always on". The telephone company might be able to operate with fewer ADSL modems than subscribers by taking advantage of the fact that some of the subscribers will power down their ADSL modems, but the telephone company still has significant investments in ADSL modems.

A host-signal processing (HSP) based ADSL modem implements most of its ADSL modulation functions via the computer processor. Therefore, it reduces the need for a separate high-speed digital signal processor (DSP). Through software implementation, it also has advantages for programming flexibility. Specifically, it allows an easy software update for improved protocols and algorithms for better performance and new standards requirement.

On the other hand, a HSP modem requires a large percentage of the CPU host power to perform the required ADSL and other functions. In general, the overall modulation functions of a typical full-rate ADSL DMT (discrete multi-tone) implementation defined by the ADSL standards (including ANSI T1.413 issue 2, ITU-T G.992.1) will require 300 MIPS. Thus, for a 300 MHz machine, ADSL driver will occupy 100% CPU usage, which is not acceptable.

To reduce this requirement, the technique so called "scalability" that allows the required CPU loaded to be adjusted according to the transmission rates has been introduced earlier (see SAM patents). As a result, we can reduce the required CPU load by operating the ADSL modem at a reduced rate.

Since ADSL is an "always-on" technology that performs physical layer modulation all the time, the ADSL transceiver normally performs all computation tasks whether or not actual data is being transferred. Although an ADSL transceiver can be disabled entirely during periods of inactivity, but since the training period at the start of an ADSL connection is quite long (usually about 20 seconds), users might find such delays intolerable.

SUMMARY OF THE INVENTION

An ADSL transceiver according to one embodiment of the present invention has a sleep state, in which the received signal is not fully processed when no data is being transferred between the transceiver and a remote transceiver or no data is expected, thus reducing a load on a host processor hosting the ADSL transceiver. By arranging for the transceiver to be in a normal state when data is being received or expected to be received, the chance of missing data when not fully processing the received signal is reduced. The transceiver can be prompted to exist the sleep state when data is being transmitted and/or periodically. If no data is detected after a period of time in the normal state, the transceiver returns to the normal state.

Because the receiver section is not fully operational in the sleep state, its output will be invalid. In that state, if data is received, it will not be processed correctly until the receiver section is reactivated and the memory associated with each element of the receiver section fills with valid data. To avoid introducing errors in the receiver section before the transceiver returns to full operation, selected outputs of the transceiver are blocked or ignored by higher layers. To quickly recover from a sleep mode, the receive section might perform minimal maintenance operations, such as maintaining timing and logical boundaries, such as frame counters, interleave boundaries and cell boundaries.

In some variations, additional elements that are not essential to keeping the connection alive, including transmit section elements, can be turned off for further savings.

One advantage of this invention is that the host processor load can be reduced without significant additional overhead or delay and the load reduction is transparent to the upper ATM layer.

Another advantage of the invention is that the transceiver can enter and exit its sleep state without loss of the ADSL connection and can do so without requiring the cooperation of the remote transceiver. Furthermore, the transitions between the sleep state and normal operation can occur without noticeable delays to the user of the subscriber node.

DESCRIPTION OF THE SPECIFIC EMBODIMENTS

The present invention is described below in the context of the particular ADSL modem architecture illustrated in FIG. 1, which is merely an exemplary illustration of how the present invention can be made and used. The below description should not be construed as limiting the present invention to the particular ADSL architecture(s) shown below.

Figure 1:
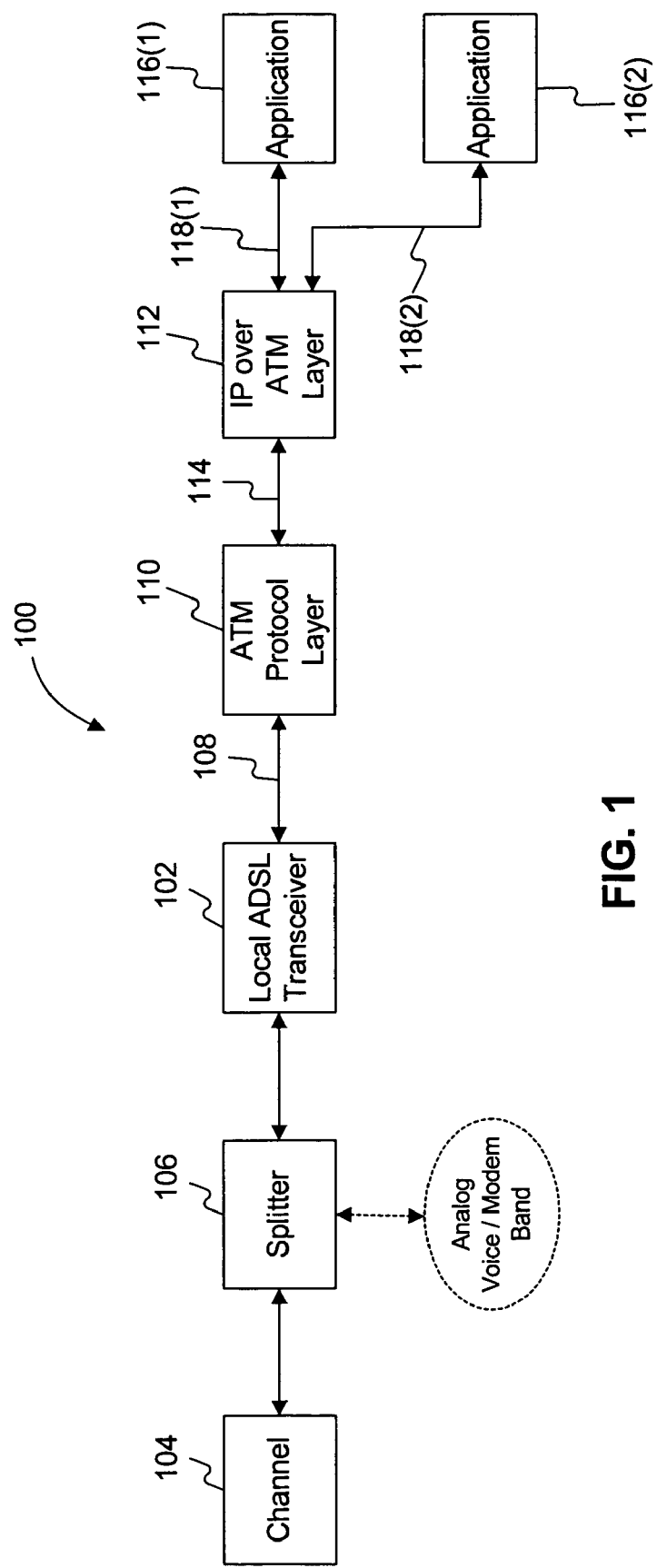
FIG. 1 is a block diagram of an ADSL node.

A high-level block diagram of an ADSL system 100 as might be used with the present invention is shown in FIG. 1. System 100 generally represents the elements of an ADSL system located at the subscriber site. As shown, a local ADSL transceiver 102 is coupled to a channel 104, which connects the subscriber site with the CO (not shown). Local ADSL transceiver 102 is coupled to channel 104 through a splitter 106, which separates out the ADSL frequency band from the conventional analog voice/modem band. Local ADSL transceiver 102 is coupled to an ATM protocol layer via a line 108. In a typical configuration, line 108 carries a data stream output from local ADSL transceiver 102 and input to an ATM protocol layer 110, as well as a data stream output from the ATM protocol layer 110 to local ADSL transceiver 102.

The ATM protocol layer 110 in turn processes the data received from local ADSL transceiver 102 and organizes the data into "ATM cells". The ATM protocol layer 110 is coupled to an IP over ATM (IPoA) protocol layer 112 by line 114. In a typical configuration, line 114 carries IP packet data between ATM protocol layer 110 and IPoA layer 112. IPoA layer 112 serves to interface the IP layer for Internet based applications 116 over lines 118 according to the IP addresses and session numbers of the applications.

In a typical operation, an application, such as application 116 (1) would send data in the form of an IP packet directed at IPoA layer 112. IPoA layer 112 would then identify the destination of the IP packet. In this example, the destination of the IP packet is external to the local system and, therefore, is destined to reach a location beyond the CO. Upon receipt of the IP packet, ATM protocol layer 110 reformats the data into ATM cells and passes it over line 108 to local ADSL transceiver 102. As explained in more detail below, local ADSL transceiver 102 includes a transmit section and a receive section. For the data stream receive from ATM protocol layer 110, local ADSL 102 provides that data stream to its transmit section, which outputs an ADSL modulated signal to splitter and channel 104, and that signal is received by a remote ADSL transceiver (not shown) at the CO.

When the remote CO sends data, it generates an ADSL modulated signal and transmits that signal over channel 104. The signal is received by the receive section of local ADSL transceiver 102. The receive section of local ADSL transceiver 102 processes and decodes the signal transmitted from the CO into a data stream, which is in turn forwarded to ATM protocol layer 110 over line 108. In a manner that is the reverse of the transmission of process, ATM protocol layer. 110 processes and formats the ATM cells into IP packets, which are then forwarded to IPoA layer 112 and ultimately to their destination, typically an application 116 at the subscriber site.

Several of the components shown in FIG. 1 can be implemented in software that is executed by a host processor at the subscriber site. As previously explained, this is referred to as host signal processing, or "HSP".

In one embodiment, portions of local ADSL transceiver 102 and the entirety of ATM protocol layer 110 and IPoA layer 112 are implemented in software executed by a host processor. It should be understood that, as used herein, determined "software" can refer to programs stored in memory, hard disk, or read only memory, such as a ROM or an FPGA. In one embodiment of local ADSL transceiver 102, some portions are implemented in hardware while the remainder is implemented in software.

Figure 2:
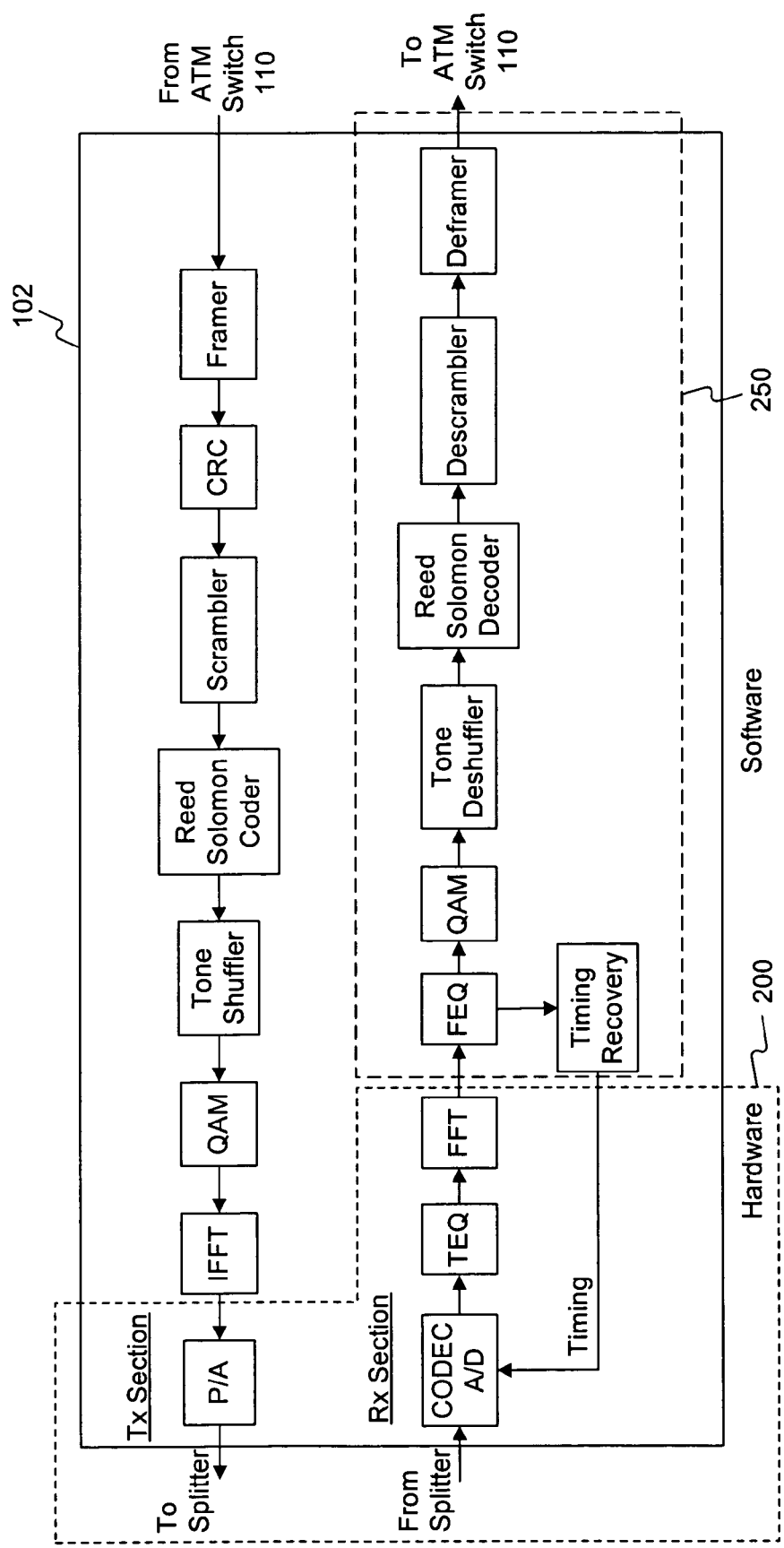
FIG. 2 is a block diagram showing the ADSL transceiver of FIG. 1 in greater detail.

FIG. 2 shows such an example of a partial hardware, partial software local ADSL transceiver implementation. In this example, the elements enclosed in the dotted border are implemented in hardware, while the other elements are implemented in software. Thus, as shown, the digital to analog converter in the transmitter section is implemented in the hardware, as are the codec and analog digital converter, a timing equalizer and a fast Fourier transform. In one embodiment of a transceiver according to the present invention, the transceiver operates in one of the three states, which are (1) a normal mode, (2) a sleep mode, and (3) a warm up mode. As explained in more detail below, in the sleep mode, the operation of some elements of transceiver 102 is skipped or the CPU load is greatly reduced. For example, the functions of the software components shown in the bordered box 250 in FIG. 2 could be largely skipped in the sleep mode. Additionally, elements of ATM protocol layer 110 could also be skipped in the sleep mode. As a result, the host-processing load is greatly reduced. As explained below, transceiver 102 further employs several strategies to insure quick recovery in the case of the unexpected receipt of data as well as quick recovery when expected data is received.

State Machine Operation

Figure 3:
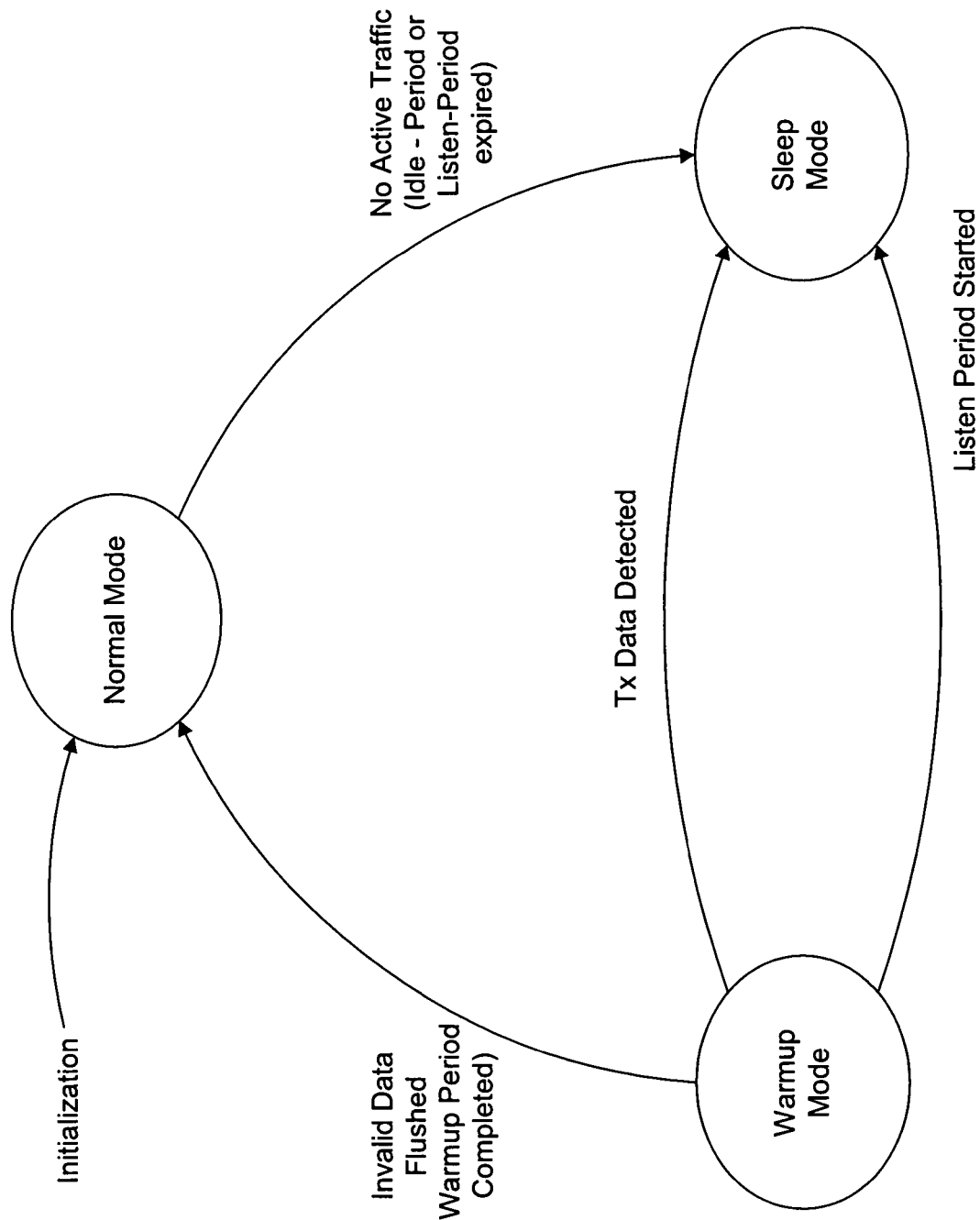
FIG. 3 is a state diagram of the ADSL transceiver of FIGS. 1–2.

The states of a transceiver with the sleep capability of transceiver 102 are shown in the state diagram of FIG. 3. The transceiver is in one of the three states: the NORMAL state, the SLEEP state and the WARMUP state. The transceiver is programmed with several variables, whose effects are explained below. These variables include IDLE_PERIOD, SLEEP_PERIOD, LISTEN_PERIOD and WARMUP_PERIOD. These variables can be programmed into the transceiver or provided from an external source. These variables might be fixed by the design of the transceiver, changeable during the operation or initialization of the transceiver, or variables dependent on external factors, such as host processor load or host processor power.

After the transceiver is initialized, it starts at the NORMAL state. The transceiver performs full ADSL functions when it is at the NORMAL state for normal data transmission. To keep the ADSL line connected without the remote transceiver incorporation, all modulation tasks in the transmission path need to be performed, even if there is no data to send. The ADSL signal in the absence of data carries "idle ATM cells". Similarly, the receive section of the ADSL modem will receive idle cells data if there is no data for the remote transceiver to send.

The transceiver enters the SLEEP state when there is no ATM traffic for a period of time defined by the IDLE_PERIOD variable. That is, after an IDLE_PERIOD number of ADSL frames, if the transceiver has not received any ATM data cells to send and has not received any ATM traffic over the channel (not considering any idle cell data transmitted or received), the transceiver will go from the NORMAL state to the SLEEP state.

At the SLEEP state, the received signal is processed by a minimal set of demodulation blocks of the receiver section just to maintain the ADSL connection. As explained in further detail below, this includes timing synchronization for symbol timing, frame timing, and superframe timing. Where these tasks are performed in software by a host processor, many software tasks in the receiver path are skipped. In order to keep the ADSL connection alive without the remote transceiver support, all the modulation functions in the transmit section are still performed. During the sleep state, the invalid received data are idle and there is no need to pass it on to ATM protocol layer 110.

In some instances, the transceiver will receive data while in the SLEEP state. Since no valid data is received at the local node when the transceiver is in the SLEEP state, some of that data will be lost. However, as explained below, that data can be recovered by requesting retransmission from the higher protocol layer (i.e., TCP or IP). As shown in FIG. 3, there are two triggers for the transceiver to exit the SLEEP state and enter the WARMUP state. One trigger is the detection of ATM data cells for transmission, and the other trigger is a periodic transition from the SLEEP state to the NORMAL state. Of course, variations of the transceiver can be made with only one of the two triggers shown or can be made with more than two triggers.

Upon the detection of the ATM traffic in the transmission direction, ATM protocol layer 110 will send a signal to the ADSL transceiver to switch to the NORMAL state. Alternatively, the software for the transceiver and the ATM protocol layer can be integrated such that the software for the ATM protocol layer would provide for a signal to the ADSL transceiver software.

The other trigger shown is the expiration of a sleep period determined by the SLEEP_PERIOD variable and the start of a listen period. One advantage to having both triggers is that the transceiver can be made ready to receive data that may come in response to the data being transmitted. In many uses of the transceiver, data is received in response to data being sent. For example, if the transceiver is sending an IP packet according to one of the common PING, FTP, HTTP, SMTP, etc. applications, the transceiver should expect a response from the Internet. Therefore, if the transceiver moves out of the SLEEP state when data is transmitted to the channel from the transceiver, the transceiver performs full demodulation tasks and it is ready to receive data when such response data arrives at the transceiver. The expiration trigger, i.e., moving out of the SLEEP state after being in the SLEEP state for SLEEP_PERIOD, is useful to check for data that the remote ADSL modem might be sending even when the transceiver had not sent any data.

When the transceiver transitions out of the SLEEP state, it first transitions into the WARMUP state. Upon entering the WARMUP state, the transceiver will resume most normal receiving tasks. Some tasks that would be performed on invalid data are not performed in this state. Once any invalid, residual data flushes out of the receiver section, valid data can be received and the transceiver transitions to the NORMAL state.

A variation of the above invention is when a transceiver has only two states: NORMAL and SLEEP. In this case, the transceiver goes into its NORMAL state immediately upon exiting the SLEEP state. In such transceivers, preferably some provision is made for possibly bad data that would be output from the receive section while the receiver path is filling with valid data. Such provisions might include some signaling to the ATM protocol layer to ignore some data, or allowing higher network layers to receive the corrupted data and handling error recovery at those higher network layers.

In another variation, the transceiver periodically "wakes up" to check for received data (i.e., transitions from SLEEP, to WARMUP and then to NORMAL), with the period determined by the SLEEP_PERIOD variable and then goes "back to sleep" if there is no activity. The amount of time the transceiver spends in these periodic wake ups is determined by the LISTEN_PERIOD variable. In another variation, the amount of time the transceiver spends listening is determined by the IDLE_PERIOD variable and the LISTEN_PERIOD variable is not used. In this latter variation, the transceiver spends the same amount of time waiting for activity before transitioning to the SLEEP state regardless of whether the period of inactivity follows a period wake up or a period of activity.

In the SLEEP state, data is not received at the local node, but the transceiver performs some minimal functions to keep the ADSL connection alive or to shorten the time spent in the WARMUP state. To maintain the ADSL connection without the support and/or awareness of the remote transceiver, all the transmitter functions should be performed even in the SLEEP state. The receive section of the sleeping transceiver, however, need only perform a minimal set of the receiving functions needed to maintain the connection.

For example, the FEQ (frequency equalizer; see FIG. 2) coefficients should be maintained and timing tracking/recovery should be kept up. For timing recovery, the A/D converter (and its AFE), the TEQ (timing equalizer), FFT (fast Fourier transform) are also needed, as well as the timing tracking. Note that those portions of the FEQ that are not needed for timing tracking can be eliminated in the SLEEP state. In a HSP ADSL modem, typically the A/D, TEQ and FFT are performed by hardware and as a result, the host only needs to run the software associated with the FEQ and timing tracking, saving considerable processor use in the SLEEP state.

In addition to the FEQ and timing tracking functions, some counters might need to be maintained to assure integrity of the entire path, even though the counter contents might not be used in the SLEEP state. Examples of such counters are a frame counter, an interleaver symbol counter and a cell pointer. The frame counter allows the host to track superframe boundaries. The interleaver symbol counter maintains the proper de-interleaving sequence and reduces the time required to be spent in the WARMUP state. The cell pointer the ATM cell boundary and avoids the need for new synchronization in cell delineation when leaving the SLEEP state.

In the WARMUP state, all receiver functions are enabled except the functions such as the function that passes output to the ATM protocol layer, the function that interprets AOC/EOC (ADSL Operation Channel/Embedded Operation Channel) data and the function that checks CRCs (cyclic redundancy checks). Disabling those functions prevents invalid data from being forwarded to the ATM protocol layer or incorrect interpretation of the ADSL overhead bytes. Note that the cell boundary in the ATM protocol layer is still being maintained during the SLEEP state to avoid the need for a new cell delineation process, even though there is no ATM data forwarded to the ATM-TC layer.

The amount of time spent in the WARMUP state (defined or represented by the variable WARMUP_PERIOD) is determined, for the most part, by characteristics of the transceiver and should preferably be only as long as the longest period that might be needed to flush invalid data from the receive section after turning back on disabled processes.

Since ADSL has a superframe structure and CRC is generated for each superframe, it is desirable to align the state transitions to the superframe boundaries. This can be done by resetting period counters coincident with a superframe boundary and specifying the various period-specifying variables in units of whole superframes. Thus, counters for state transitions, such as an IDLE_PERIOD or SLEEP_PERIOD counters can be integer counters decremented (or incremented) at the end of each superframe.

The setting for a counter that sets the length of time in the WARMUP state should take into account whether the transceiver uses a fast path or an interleaved path. In the case of the fast path, the CRC is calculated through the whole superframe and put in the first frame of the next superframe. To avoid CRC errors, WARMUP_PERIOD should be at least as long as one DMT symbol interval.

In the case of the interleaving path, the CRC is calculated through the whole superframe and put in the first frame of the next superframe, but the interleaver introduces a delay and the interleaver buffer needs to be flushed in the interleaver function block. To avoid CRC errors in this case then, WARMUP_PERIOD should be at least S*D+1 DMT symbol intervals, where S is the number of symbols per Reed-Solomon codeword and D is the interleave depth.

In a highly optimized transceiver, the sleeping elements might not all be started when the transceiver transitions from the SLEEP state to the WARMUP state. For example, some elements of the receive section that are nearer to the ATM protocol layer and take little time to recover might be disabled at the beginning of the WARMUP state if the other elements are not yet ready to pass valid signals to those elements.

Detecting Data Traffic

In determining whether or not to transition from the NORMAL state to the SLEEP state, the transceiver must determine whether there is any data traffic to keep the transceiver in the NORMAL state. Several steps of such a determination are explained below, but first portions of the OSI model are explained.

In the OSI (Open System Interconnection) Model, which was developed by the ISO (International Organization for Standardization), ADSL serves as the lowest layer (the "physical" layer). Above the physical layer are the data link layer, the network layer, and so on. The ADSL protocol, as defined by ANSI and ITU-T, supports two modes from the data link layer: STM (Synchronous Transfer Mode) and ATM (Asynchronous Transfer Mode). STM is used for TDM traffic, such as T1 or E1, and ATM is used for data traffic carried by ATM cells. Currently, ATM mode at the data layer and ADSL at the physical layer is used more because of the benefits of ATM over STM in the more common uses of these protocols.

When the data link layer is ATM, data packets from the upper layers are converted to a series of ATM cells, which are then modulated by the ADSL layer. There are also other types of cells, such as OAM (Operation, Administration and Maintenance) cells. They serve as the control channel of the ATM protocol layer. If there is no packet data or OAM cells to be sent, idle cells of a fixed pattern are "stuffed" into the transmit cell stream for ADSL modulation. At the other end of the receiving ADSL node, idle cells are removed at the ATM protocol layer.

In this context, data traffic detection is performed by checking for transmission traffic and reception traffic. Depending on the specific implementation, transmission traffic can be detected by detecting non-idle cells, detecting IP packets, or detecting either. Non-idle cells can be detected by checking for non-idle cells being received at the ATM protocol layer. IP packet traffic can be detected by monitoring the IP-ATM interface. In most implementations, detecting non-idle cells is the preferred method of detection since the ADSL transceiver might not be able to interact with the ATM-IP interface directly. Similarly, reception traffic can be detected by monitoring the ATM protocol layer output for non-idle cells.

Measuring Host Processor Load Reduction

The reduction of load on a host processor (such as a CPU or other instruction processor) can be estimated by considering the values of the variables associated with the state diagram of FIG. 3.

Since WARMUP_PERIOD is fixed by the protocol itself, the values of IDLE_PERIOD, LISTEN_PERIOD and SLEEP_PERIOD can be adjusted to adjust the CPU load. An example is described below, but other values and examples will also be apparent to one of ordinary skill in the art, upon review of this disclosure. For simplicity, this example assumes that IDLE_PERIOD=LISTEN_PERIOD (i.e., LISTEN_PERIOD is not used as a separate variable) and therefore only IDLE_PERIOD and SLEEP_PERIOD are independent variables. In practice, these variables can be set (in a fixed manner or dynamically) to address different design tradeoffs.

The smaller IDLE_PERIOD is relative to SLEEP_PERIOD, the greater the processor load savings. However, the ratio of those two values involves a tradeoff. If SLEEP_PERIOD is too large, the data to be received by the transceiver will have an increased latency, as the receiver is not ready to receive data during the SLEEP state. Another consideration is that SLEEP_PERIOD and IDLE_PERIOD should be large relative to WARMUP_PERIOD, so that the transceiver does not spend much of its time in the WARMUP state (a state in which host processing is consumed in greater amounts than sleeping, but in which data still cannot be received). However, the larger numbers may tend to increase latency.

In one experiment, the following values were found to provide acceptable performance, processor load savings and delay:

IDLE_PERIOD=100 superframes (1.7 seconds)
    SLEEP_PERIOD=900 superframes (15.3 seconds)
    WARMUP_PERIOD=1 superframe (17 milliseconds)

Given a load in the NORMAL state and a load in the SLEEP state, and the above variables, a relative load can be calculated (WARMUP_PERIOD is small enough relative to the others that it can be ignored). Thus, for an implementation of an ADSL node where the proportion of the host that is used in the NORMAL state is given by N_LOAD and the proportion of the host that is used in the SLEEP state is given by S_LOAD, the reduction in CPU load, R, when no traffic is being carried is given by:

$$R=(N\_LOAD*IDLE\_PERIOD+S\_LOAD*SLEEP\_PERIOD)/(IDLE\_PERIOD+SLEEP\_PERIOD)$$

With a typical downstream rate, S_LOAD is around one half to one third of N_LOAD. In some cases, N_LOAD can be much more than three times S_LOAD with an entirely symmetric transceiver, one might expect that the sleep load (S_LOAD) would be slightly more than one half of the normal load (N_LOAD) since both sections (transmit and receive) of the transceiver are active in the NORMAL state and only one section and a small portion of the other section are active in the SLEEP state. However, ratios of less than one half are common, since the number of computing cycles needed to receive a given amount of data is more than the number of computing cycles needed to transmit that same amount of data.

Another factor that tends to lower the ratio of S_LOAD/N_LOAD is that the typical ADSL transceiver that is sleep-enabled is the ADSL transceiver at the subscriber node rather than the transceiver at the CO node. Since ADSL is asymmetric in that the subscriber node receives data at a higher rate that it transmits data, sometimes ten times as much, the receive section needs even more processor cycles than the transmit section, resulting in greater savings, (i.e., a lower S_LOAD/N_LOAD ratio).

Where the ratio of S_LOAD to N_LOAD is 1/3, and using the above values, R is as follows:

$$R=(N\_LOAD*100+(N\_LOAD/3)*900)/(100+900)$$
$$=0.4*N\_LOAD$$

indicating that the sleep-enabled transceiver described above would, on average, reduce the amount of processor load it needed to operate by about 60%. This can be significant in some cases. For example, where an ADSL transceiver is hosted by a 450 MHz Pentium II machine running an 8 Mbps downstream rate would might require 75% of the available CPU load if not sleep enabled. However, with a sleep-enabled transceiver, the CPU load used, on average, when the ADSL connection is alive, but idle, can be as low as 30% of the available load.

An ADSL transceiver that reduces its load on a host processor has now been described. A host-based signals processor (HSP) implements parts of the ADSL functionality in software and the load is reduced by not performing some of the functions normally required for full ADSL operation. Similar load savings might be achieved in ADSL circuits that are not host-based, such as hardware implementations. For example, some of the receive section circuits in an all-hardware ADSL circuit could be turned off to save power.

The above description is illustrative and not restrictive. Many variations of the invention will become apparent to those of skill in the art upon review of this disclosure. Merely by way of example, while the above description uses ADSL as an example, the teachings of this disclosure can also be applied to other DSL technologies, such as VDSL, HDSL, SDSL, DSL, and other members of the family of technologies generally known as xDSL. The scope of the invention should, therefore, be determined not with reference to the above description, but instead should be determined with reference to the appended claims along with their full scope of equivalents.

What is claimed is:

1. A DSL transceiver comprising:
    a receive section that receives a DSL signal from a DSL channel when the DSL transceiver is connected;
    a transmit section that transmits a DSL signal to the DSL channel when the DSL transceiver is connected;
    a controller that detects whether the DSL transceiver has not received valid data over the DSL channel for a first predetermined period of time indicating an idle period and detects expiration of a second period of time triggering an end of the idle period; and
    a selective processing subsection of the receive section that omits at least some of the processing for reception of valid data from the DSL channel when the controller detects that the DSL transceiver has not received valid data over the DSL channel for the first predetermined period of time and resumes operation of the omitted processing when the controller detects expiration of the second period of time.

2. The DSL transceiver of claim 1, wherein the DSL transceiver is a host-signal processing based DSL transceiver.

3. The DSL transceiver of claim 1, further comprising state logic to place the selective processing subsection into a normal state, a sleep state or a warmup state, wherein the warmup state is entered after exiting the sleep state and before entering the normal state, and wherein in the warmup state the DSL transceiver resumes a subset, but not all, of the processing omitted.

4. The DSL transceiver of claim 3, wherein the controller comprises a state logic that, in response, to the controller determining to resume operation of the omitted processing, places the selective processing subsection into a state in which the subsection resumes operation of some, but not all, of the omitted processing before transitioning to a state where the subsection resumes operation of all of the omitted processing.

5. The DSL transceiver of claim 3, wherein after the selective processing subsection resumes operation of all of the omitted processing, the controller determines to again place the subsection in the state in which the subsection omits at least some of the processing, in response to the controller determining that the DSL transceiver has not received valid data for a third predetermined period of time.

6. The DSL transceiver of claim 1, wherein the controller detects whether the DSL transceiver has not received or transmitted valid data over the DSL channel by determining whether valid data has been received at an ATM protocol layer.

7. The DSL transceiver of claim 1, wherein the controller detects whether the DSL transceiver has received or transmitted valid data over the DSL channel by monitoring IP packet traffic at an IP-ATM interface.

8. A method for use in a DSL communications system comprising:
receiving a DSL signal from a DSL channel;
transmitting a DSL signal to a DSL channel;
processing data in the received DSL signal;
detecting the reception of non-valid data over the DSL channel for a first predetermined period of time indicating an idle period and expiration of a second period of time triggering an end of the idle period; and
omitting at least some of the processing of the data in the received DSL signal in response to detecting the reception of non-valid data over the DSL channel for the first predetermined period of time and resuming operation of the omitted processing in response to detecting the expiration of the second period of time.

9. The method of claim 8, wherein the DSL communications system is a host-signal processing based DSL transceiver.

10. The method of claim 8, further comprising:
placing the DSL communications system into a sleep state in response to the detecting of non-valid data received over the DSL channel for the first period of time;
placing the DSL communications system into a warmup state after existing the sleep state, wherein in the warmup state the DSL communications system resumes a subset, but not all, of the omitted processing; and
placing the DSL communications system into a normal state after exiting the warmup state.

11. The method of claim 10, further comprising:
entering, in response to determining to resume operation of the omitted processing, a state in which the DSL communications system resumes operation of some, but not all, of the omitted processing before transitioning to a state wherein all of the omitted processing is resumed.

12. The method of claim 11, further comprising:
detecting the reception of non-valid data for a third predetermined period of time after resuming operation of the omitted processing; and
determining to again omit at least some of the processing in response to detecting the reception of idle data for the third period of time.

13. The method of claim 8, wherein the step of detecting the reception of non-valid data over the DSL channel for the first predetermined period of time comprises detecting whether valid data has not been received at an ATM protocol layer.

14. The method of claim 8, wherein the step of detecting the reception of non-valid data over the DSL channel for the first predetermined period of time channel comprises monitoring IP packet traffic at an IP-ATM interface.

15. A system for DSL communications comprising:
means for receiving a DSL signal from a DSL channel;
means for transmitting a DSL signal to a DSL channel;
means for processing data in the received DSL signal;
means for detecting reception of non-valid data over the DSL channel for a first predetermined period of time indicating an idle period and expiration of a second period of time triggering an end of the idle period; and
means for omitting at least some of the processing of the data in the received DSL signal in response to detecting the reception of non-valid data over the DSL channel for the first predetermined period of time to initiate an idle period and resuming operation of the omitted processing in response to detecting expiration of the second period of time.

16. The system of claim 15, wherein the system is a host-signal processing based DSL transceiver.

17. The system of claim 15, further comprising:
means for placing the DSL communications system into a sleep state in response to the detecting of non-valid data received over the DSL channel for the first period of time;
means for placing the DSL communications system into a warmup state after exiting the sleep state, wherein in the warmup state the system resumes a subset, but not all, of the omitted processing; and
means for placing the system into a normal state after exiting the warmup state.

18. The system of claim 17, further comprising:
means for entering, in response to determining a resume operation of the omitted processing, a state in which the DSL communications system resumes operation of some, but not all, of the omitted processing before transitioning to a state wherein all of the omitted processing is resumed.

19. The system of claim 18, further comprising:
means for detecting the reception of non-valid data for a third predetermined period of time after resuming operation of the omitted processing; and
means for determining to again omit at least some of the processing in response to detecting the reception of idle data for the third period of time.

20. The system of claim 15, wherein the means for detecting the reception of non-valid data over the DSL channel for the first predetermined period of time comprises means for detecting whether valid data has been received at an ATM protocol layer.

21. The system claim 15, wherein the means for detecting the reception of non-valid data over the DSL channel for the first predetermined period of time comprises means for monitoring IP packet traffic at an IP-ATM interface.

22. A system for DSL communication comprising:
a transmit section for transmitting a DSL signal to a DSL channel;
a receive section for receiving the DSL signal from the DSL channel;
a data traffic detector that detects whether no data traffic is transmitted over the DSL channel indicating an idle period and whether a sleep period has expired triggering an end of the idle period; and a mode selection subsection of the receive section that omits a plurality of processing for responding to the data traffic in response to the data traffic detector detecting that there is no data traffic over the DSL channel and resuming at least one of the omitted processing in response to the data traffic detector detecting expiration of the sleep period.

23. The system of claim 22, wherein the mode selection subsection further resumes at least one of the omitted processing in response to the data traffic detector detecting that there is data traffic over the DSL channel.

24. The system of claim 23, wherein the mode selection subsection further resumes only some of the omitted processing in response to the data traffic.

25. The system of claim 23, wherein the mode selection subsection further resumes all of the omitted processing in response to the data traffic.

26. The system of claim 22, wherein the mode selection subsection further resumes at least one of the omitted processing when the omitted processing have been omitted for a time period associated with communication of non-valid data.

27. The system of claim 26, wherein the mode selection subsection further resumes only some of the omitted processing when the omitted processing has been omitted for a time period associated with communication of non-valid data.

28. The system of claim 26, wherein the mode selection subsection further resumes all of the omitted processing when the omitted processing has been omitted for a time period associated with communication of non-valid data.

29. The system of claim 26, wherein a length of the time period associated with communication of non-valid data is predetermined.

30. The system of claim 29, wherein the length of the time period associated with communication of non-valid data is fixed.

31. The system of claim 26, wherein the length of the time period associated with communication of non-valid data is changeable.

32. The system of claim 22, wherein the data traffic detector detects valid data transmitted over the DSL channel.

33. The system of claim 22, wherein the data traffic detector detects Internet Protocol (IP) packets.

34. A DSL communication method comprising:
detecting whether there is no data traffic over a DSL channel; and
omitting a plurality of processing for responding to the data traffic if there is no data traffic over the DSL channel for a first period of time indicating the idle period and resuming the omitted processing if a second time period expires triggering an end of the idle period.

35. The system of claim 34, wherein the method further comprises:
resuming at least one of the omitted processing in response to data traffic being detected over the DSL channel.

36. The system of claim 35, wherein the method further comprises:
resuming only some of the omitted processing in response to data traffic being detected over the DSL channel.

37. The system of claim 35, wherein the method further comprises:
resuming all of the omitted processing in response to data traffic being detected over the DSL channel.

38. The method of claim 34, wherein the method further comprises:
resuming at least one of the omitted processing when the omitted processing has been omitted for a time period associated with communication of non-valid data traffic.

39. The method of claim 38, wherein the method further comprises:
resuming only some of the omitted processing when the omitted processing has been omitted for a time period associated with communication of non-valid data traffic.

40. The method of claim 38, wherein the method further comprises:
resuming all of the omitted processing when the omitted processing has been omitted for a time period associated with communication of non-valid data traffic.

41. The method of claim 38, wherein a length of the time period associated with communication of non-valid data traffic is predetermined.

42. The method of claim 38, wherein the length of the time period associated with communication of non-valid data traffic is fixed.

43. The method of claim 38, wherein the length of the time period associated with communication of non-valid data traffic is changeable.

44. The method of claim 34, further comprising:
detecting valid data as the detected data traffic.

45. The method of claim 34, further comprising:
detecting Internet Protocol (IP) packets as the detected data traffic.

46. A communication device comprising:
a receiving unit to receive valid data or non-valid data on a channel;
a transmitting unit to transmit valid data or non-valid data on the channel; and
a controller to perform a plurality of operations for processing valid data or non-valid data and to omit some of the operations if non-valid data is received for a first period of time indicating an idle period, wherein the controller resumes the omitted operations after expiration of a second period of time triggering an end of the idle period.

47. The communication device of claim 46, wherein the controller performs operations in a normal mode, sleep mode, and warm up mode.

* * * * *

UNITED STATES PATENT AND TRADEMARK OFFICE
CERTIFICATE OF CORRECTION

PATENT NO. : 7,085,283 B1 Page 1 of 1
APPLICATION NO. : 09/526646
DATED : August 1, 2006
INVENTOR(S) : Liu et al.

It is certified that error appears in the above-identified patent and that said Letters Patent is hereby corrected as shown below:

In column 10, line 56, in Claim 2, delete "DSL" and insert -- ADSL --, therefor.

In column 10, line 66, in Claim 4, delete "response," and insert -- response --, therefor.

In column 12, line 37, in Claim 18, after "determining" delete "a" and insert -- to --, therefor.

In column 13, line 50, in Claim 34, after "indicating" delete "the" and insert -- an --, therefor.

Signed and Sealed this

Fourteenth Day of November, 2006

JON W. DUDAS
*Director of the United States Patent and Trademark Office*